UNITED STATES PATENT OFFICE.

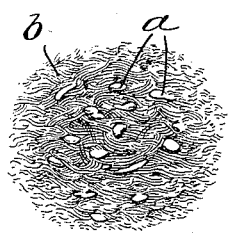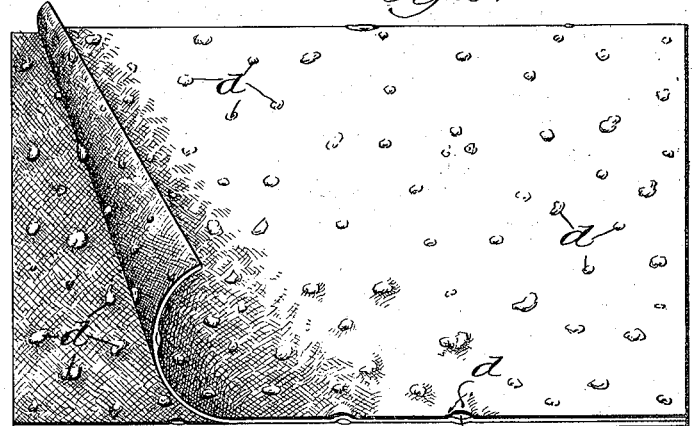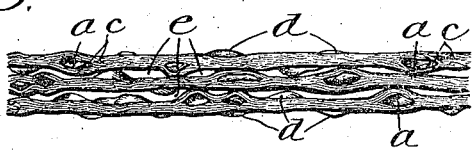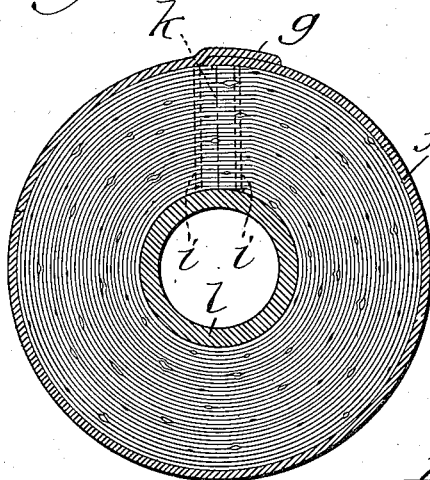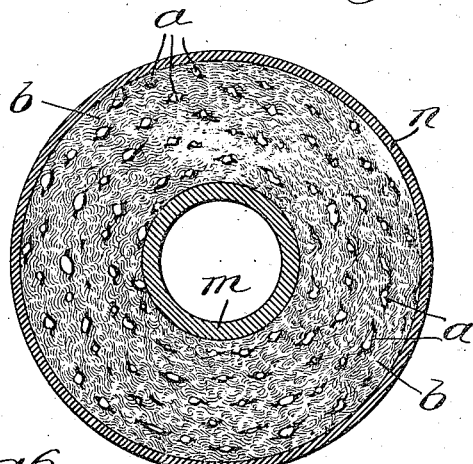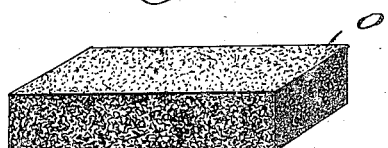

CHARLES R. MANVILLE, OF MILWAUKEE, WISCONSIN, ASSIGNOR TO H. W. JOHNS-MANVILLE COMPANY, OF MILWAUKEE, WISCONSIN, A CORPORATION OF NEW YORK.

HEAT-INSULATING COVERING.

1,218,679. Specification of Letters Patent. Patented Mar. 13, 1917.

Application filed January 8, 1914. Serial No. 810,976.

*To all whom it may concern:*

Be it known that I, CHARLES R. MANVILLE, a citizen of the United States, and a resident of Milwaukee, in the county of Milwaukee and State of Wisconsin, have invented certain new and useful Improvements in Heat-Insulating Coverings; and I do hereby declare that the following is a full, clear, and exact description thereof, reference being had to the accompanying drawings, and to the letters of reference marked thereon, which form a part of this specification.

This invention relates to a non-conducting or heat-insulating material, composition or compound, and to a sheet or other structure formed of such composition or material and adapted to be used for forming an insulating covering for water pipes, steam pipes, conduits, or other receptacles or devices having heated or cold surfaces to be insulated or covered.

The principal object of the invention is to provide a simple, economical, durable and efficient non-conducting or heat-insulating compound or material, adapted to be used as a filler, heat-insulating lining or casing, or for covering pipes, conduits, or receptacles having heated or cold surfaces, for insulating purposes.

Further objects of the invention are to provide a covering having suitable air spaces or air cells, and which is light in proportion to its bulk and composed of material all of the elements of which are durable and in a large degree free from liability to premature decomposition or deterioration and also free from objectionable odors when in a heated condition or in use, and none of the elements of which contains salt or other material having a tendency to corrode or injuriously affect pipes or any metallic receptacle or surface, adapted to form a heat-insulating covering for pipes, conduits, or other receptacles, or devices having heated or cold surfaces.

Other and further objects of the invention will appear from an examination of the following description and claims and from an inspection of the accompanying drawings which are made a part of this application.

The invention consists in the features, combinations of elements, and details of construction herein described and claimed.

In the accompanying drawings, Figure 1 is a plan view of a mass of non-conducting or insulating material suitable for the purposes of my invention;

Fig. 2, a perspective view of a plurality of sheets or layers of heat-insulating material made in accordance with my invention, but of exaggerated proportions;

Fig. 3, an enlarged detail view in section, showing a plurality of layers or laps formed of a sheet or sheets such as those shown in Fig. 2;

Fig. 4, a transverse sectional view of a cylindrical covering or casing formed of a sheet such as that shown in Fig. 2;

Fig. 5, a transverse sectional view of a pipe or receptacle covered by non-conducting or heat-insulating material, such as that shown in Fig. 1; and Fig. 6, a view in perspective of a block of non-conducting or heat-insulating material, made in accordance with my invention, and adapted to be used for forming a covering, lining or other structure for insulating purposes.

In making a non-conducting or heat-insulating composition or compound, and a covering or heat insulator for pipes, conduits, or other receptacles, or for hot or cold surfaces, in accordance with my invention and improvements, I provide a suitable quantity of thoroughly cured corn-cobs $a$ and a quantity of fibrous material, which, in the best form of my invention as herein described, consists of fibrous asbestos $b$, and these substances are intermixed in suitable proportions. (See Fig. 1.)

The corn-cobs are cut, ground, crushed, or disintegrated in any ordinary or well known manner, so as to constitute a fragmental or granular substance, the particles of which although of unequal sizes are, by preference, usually of such dimensions as to enable them to pass through a screen of about one-quarter inch mesh. The sizes of the particles may of course be varied in practice as desired. The grains or particles of corn-cobs are in part rigid, or non-yielding, and in part flexible, and are somewhat porous. They thus constitute a substance, the comparatively flexible parts of which are adapted to be very closely and securely united with other flexible or fibrous elements—such as fibrous asbestos—to form a compound or mixture adapted to be used for heat insulation either with or without a binder composed of starch, tapioca, or other suitable adhesive or binding agent.

The ground, crushed or disintegrated corn-cobs are placed in a suitable receptacle, which may consist of an ordinary beating engine of the kind used for beating rags or fiber in preparing them for use in the making of fabric or paper or for other purposes, and a suitable quantity of fibrous material, such as fibrous asbestos—which has been previously prepared by being shredded, ground or crushed, or otherwise reduced to a suitable fibrous, shredded condition—is introduced and intermixed with the ground corn-cobs or granular material. A sufficient quantity of water is added to the above elements to make a wet mass or pulp and the entire mass is thoroughly beaten to a pulp similar to that commonly used in the manufacture of paper. A binder, consisting of or comprising a suitable quantity of starch, tapioca, or other suitable binder or adhesive, may be, and in practice usually is, intermixed with the ground corn-cobs and fibrous material. The grains or particles of the corn-cobs contained in the pulp thus formed are, as already suggested, in part comparatively non-yielding and in part flexible, and are of a porous character. The asbestos or fibrous material, therefore, securely adheres to the surface of the particles of ground corn-cobs, so as to form a mixture or cohering mass, the particles of corn-cob being embedded in and entirely covered by the asbestos or fibrous material, all of the elements being adapted to cohere when formed into a finished homogeneous body, sheet, block, covering, or other structure. A composition or heat-insulating material is thus provided which is adapted for use in the mass in plastic form, or to be made up and used in the form of a sheet or sheets or layers which may be laid together in flat form or wrapped or folded to form superposed layers of sheet material, or otherwise used for heat-insulating purposes.

In making a sheet or sheets, or a covering consisting of a sheet or sheets composed of the compound or material thus provided, the material above described, while in the form of a wet pulp, is passed to the usual web-forming means, which may be of the kind ordinarily used in making paper, and sent over the rolls of a paper machine,—which of course includes the usual heated drying rolls. Such a machine may be of any ordinary and well known type, and it is therefore deemed unnecessary to describe or illustrate the same herein. The heat-insulating material is thus formed into a sheet having grains or particles of ground corn-cob embedded therein and all entirely covered by the fibrous material or asbestos which forms the entire outer surface portion of the sheet. Fibrous asbestos is adapted to form a fire-proof protecting covering for the granular material or particles of ground corn-cob. The sheet thus formed has rough, irregular surfaces, the protruding surface portions $d$ of which are produced at irregular intervals throughout the sheet by those particles of ground corn-cob which are of greater thickness than the portions of the sheet located between said particles. The sheet thus provided is not calendered or compressed so as to form a dense or closely packed body, but, on the contrary, the particles of ground corn-cob and inorganic fibrous material or asbestos are somewhat loosely united so as to form a sheet of somewhat soft and loose texture which contains a multiplicity of small air spaces or air cells $c$ between the particles of material of which the sheet is formed. The comparatively non-yielding larger particles of corn-cob and the protrusions or relatively thick portions of the sheet produced thereby, as above suggested, are adapted to maintain the adjacent surface portions or layers of the sheet or of a covering or structure comprising a plurality of layers, sheets or plies, in sufficiently loose contact or so spaced apart as to provide air spaces or air cells $e$ therebetween for adding to the heat-insulating qualities. (See Figs. 2 and 3.)

When a sheet or sheets of the material, such as that shown in Fig. 2, and having rough or uneven surfaces as described, is wrapped or arranged to form a covering comprising a plurality of layers or thicknesses, as indicated in Figs. 2, 3 and 4, or arranged to form superposed layers in flat form, in the form of a slab or other desired construction, the resultant structure or covering is very light in proportion to its bulk, and, as suggested, has air spaces or air cells between and separated by the laps throughout the structure, and constitutes a very economical and efficient non-conducting or heat-insulating covering or material which will not swell or rot or produce a bad odor when it becomes damp, while in contact with a hot surface, or while in use in connection with either hot or cold surfaces, for heat-insulating purposes.

In making a pipe covering, such as indicated in Fig. 4, a sheet of the material above described is wound upon a mandrel, or otherwise wrapped, folded or laid so as to provide a structure or covering comprising superposed layers of heat-insulating material which are adapted to be secured together by means of an adhesive or stitching, or other securing means, so as to form a cylindrical or other suitably shaped structure or covering. (See Fig. 4.) The outer surface of the covering may be covered by one or more layers of canvas or other suitable fabric or covering $f$, the marginal portions $g$ of which are secured together by an adhesive, or in any other suitable manner. The covering in this form is adapted to be used for many purposes without being split longitudinally. But by securing the laps or layers of the structure together by means of staples or stitching $i$, or other suitable securing means, and longitudinally splitting or cutting through a portion of the cylindrical structure located between said staples or securing means, at the point indicated by the broken line $k$ in Fig. 4, so as to split the structure or cover longitudinally throughout its entire length, a circumferentially flexible, longitudinally split covering is produced, which is adapted to be opened so as to admit a pipe, conduit, or other article $l$. (See Fig. 4.) The longitudinal marginal portions of the covering, thus adapted to be separated, may readily be bent again to normal position around the pipe so as to form a complete covering entirely surrounding the same. The marginal projecting portions $g$ of the outer layer or canvas portion $f$ are adapted to be secured in position to overlap and securely hold or draw the marginal portions of the covering or insulating structure together so as to completely encircle and cover a pipe or other receptacle.

The material composed of or comprising intermixed ground corn-cob and fibrous asbestos, without being saturated or reduced to a wet pulp, is adapted to be used as a filler for packing around pipes, conduits or other receptacles, as indicated in Fig. 5, where the compound or material is shown packed around a pipe $m$, and between such pipe and an outer inclosing wall or casing portion $n$, which may be of any suitable material.

The ground corn-cob and asbestos or fibrous material may be intermixed and satisfactorily used in proportions which may vary to a considerable extent without departing from the spirit of my invention.

A composition or mixture consisting of one part fibrous asbestos or fibrous material and three parts of ground or crushed, disintegrated, cured corn-cob, by weight, produces a very desirable compound or composition which has been found in practice to be suitable and satisfactory for use in dry form as a filler for packing around steam pipes and other conduits or receptacles having hot or cold surfaces, for insulating purposes. Such a compound is also well adapted for use with a sufficient quantity of water—to which may be added a binder of starch or tapioca or other suitable adhesive—to produce a wet pulp of substantially the consistency of the wet paper pulp used in paper making, such pulp being made into sheets, blocks, or strips or a covering comprising a plurality of layers, or other structure, for insulating purposes, as already described.

The binder may consist of 75 pounds of starch or 60 pounds of tapioca to be added to a mass of the intermixed corn-cob and fibrous material weighing 2,000 pounds, or thereabout, although this proportion of these elements may be varied to a considerable extent without departing from the spirit of my invention.

The composition in plastic form, or with only enough liquid contained therein to render the composition of the consistency of a paste or plaster, and either with or without a binder, is suitable for use as a plaster or cement to be applied in any manner, or to be molded or otherwise made into blocks, sheets, or strips, to form a heat-insulating covering or filler, for the insulation of both hot and cold surfaces.

To the dry or cured corn-cob and fibrous material or asbestos intermixed in the above proportions, or in other suitable proportions such as may be found desirable in practice, may be added a sufficient quantity of water and a filler of suitable material $o$, such as clay or the like, thus rendering the composition plastic. In this plastic condition, the composition is adapted to be used as a cement or plaster, or to be molded or otherwise formed into blocks, strips or sheets to form a heat-insulating covering, or a filler, for the insulation of both hot and cold surfaces. (See Fig. 6.)

A composition consisting of or comprising ground cured corn-cob and asbestos, either with or without a binder of starch, tapioca, or other adhesive, is not unduly liable to decompose or swell when subjected to heat and dampness or changes of temperature, and is free from disagreeable odors. It contains no animal matter and no salt or other similar material which in itself or in combination with the other elements of the composition, or in contact with heated or cold surfaces, will cause the latter to corrode or rust or cause either the covering or the surface covered to deteriorate. The covering is very light in proportion to its bulk and is of loose texture and provided with air spaces or cells, thus being highly efficient for insulating purposes.

The composite or composition consisting of or comprising asbestos fiber in the mass of which granulated corn-cob is distributed, whether used in loose or felted form, or in laminated or sheet form, or packed into compartments prepared for it, or used in any of the forms above suggested, is adapted to be, as it often is in practice, subjected to more or less pressure and at the same time to dampness, or alternately saturated or dampened and dried, while subjected to variations in temperature with or without compression. The compression or pressure may result from confining or packing the material within a limited space or inclosure or from the weight of the material or other conditions or causes, and the degree of dampness or saturation and of compression may vary or be reduced or removed, for instance, by changes in temperature. The herein described material will maintain its efficiency under these varying conditions, and one of the principal objects of this invention is to enable this to be accomplished. The granulated corn-cob, even though subjected to pressure when wet, will not be reduced in bulk appreciably or to an extent which would materially lessen its bulk when dry, or cause it to settle or become shrunken or loose after having been alternately saturated and dried. On the contrary, the bulky corn-cob granules, even when saturated with moisture and compressed, retain their shape and size almost unchanged, and maintain the material as a whole practically undiminished in volume or bulk, so that the granules and the air cells or pockets are of practically normal size throughout the structure, although the material may have been repeatedly moistened and dried.

I claim:

1. A new article of manufacture of the class described, comprising a sheet formed of a mixture containing fibrous asbestos and particles of corn-cob embedded in and in adhesive engagement with the fibrous asbestos.

2. A new article of manufacture of the class described, consisting of a sheet of heat insulating material comprising in its construction a mixture of fibrous asbestos, particles of corn-cob, and a binder, the particles of corn-cob being embedded in and in adhesive engagement with the fibrous asbestos.

3. A new article of manufacture of the class described, comprising a sheet formed of a mixture containing fibrous asbestos and particles of corn-cob embedded in and in adhesive engagement with the particles of asbestos, said sheet having relatively thick sheet portions formed by particles of said corn-cob material and the material in which said particles of corn-cob are embedded, and having relatively thin sheet portions intermediate the portions of the sheet in which the particles of corn-cob forming part of said relatively thick sheet portions are contained.

4. A new article of manufacture of the class described, comprising a sheet formed of a mixture containing fibrous asbestos and particles of corn-cob embedded in the asbestos, said particles of corn-cob and the portions of the fibrous asbestos in which the particles of corn-cob are embedded forming protruding sheet portions which project outward with respect to the surface portions of the sheet intermediate the particles of corn-cob.

5. A new article of manufacture of the class described, consisting of superposed layers of heat-insulating material having air spaces therebetween, said material comprising fibrous material and non-yielding particles of corn-cob, said particles of corn-cob being embedded in and entirely covered by the fibrous material but causing surface elevations so as to form said air spaces between the layers.

6. A new article of manufacture of the class described, comprising superposed layers of heat-insulating sheet material having air spaces therebetween, said material comprising fibrous asbestos and particles of corn-cob, the particles of corn-cob being embedded in and covered by the asbestos, but causing surface elevations so as to form said air spaces between the layers.

In testimony, that I claim the foregoing as my invention I affix my signature in the presence of two witnesses, this 6th day of January, A. D. 1914.

CHARLES R. MANVILLE.

Witnesses:
FRANK A. HEADON,
THOMAS T. LYMAN.